US012587508B2

(12) United States Patent
Seyama

(10) Patent No.: US 12,587,508 B2
(45) Date of Patent: Mar. 24, 2026

(54) DATA COMMUNICATION SYSTEM, DATA COMMUNICATION DEVICE, HOST DEVICE, DATA COMMUNICATION METHOD, AND DATA COMMUNICATION PROGRAM

(71) Applicant: Murata Manufacturing Co., Ltd., Kyoto (JP)

(72) Inventor: Hideo Seyama, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 142 days.

(21) Appl. No.: 18/213,896

(22) Filed: Jun. 26, 2023

(65) Prior Publication Data

US 2024/0080305 A1     Mar. 7, 2024

(30) Foreign Application Priority Data

Sep. 2, 2022     (JP) ................................. 2022-139893

(51) Int. Cl.
*H04L 9/40*       (2022.01)
*H04L 9/32*       (2006.01)

(52) U.S. Cl.
CPC ........ *H04L 63/0428* (2013.01); *H04L 9/3236* (2013.01)

(58) Field of Classification Search
CPC ...... H04L 9/3236; H04L 9/08; H04L 63/0428
USPC ........................................................ 713/168
See application file for complete search history.

(56) References Cited

U.S. PATENT DOCUMENTS

RE39,360 E * 10/2006 Aziz ................... H04L 63/0428
                                            713/153

8,949,595 B2 * 2/2015 Kwon ................... H04L 63/166
                                            713/155
9,871,767 B2 * 1/2018 Mazzarella ......... H04L 63/0428
10,365,866 B2 * 7/2019 Yoshida ................ H04L 9/0897
10,595,352 B2 * 3/2020 McColgan ............ H04W 12/50
11,271,898 B2 * 3/2022 Karuppiah .......... H04L 61/5014
11,689,358 B2 * 6/2023 Arkko ................... H04L 9/0825
                                            380/30
2003/0037235 A1 * 2/2003 Aziz ....................... H04L 63/06
                                            713/160

(Continued)

FOREIGN PATENT DOCUMENTS

| JP | 2011-530260 A | 12/2011 |
| JP | 2017-211850 A | 11/2017 |
| JP | 2021-057834 A | 4/2021 |

OTHER PUBLICATIONS

International Search Report mailed on Nov. 7, 2023, in corresponding PCT/JP2023/030887, 5 pages.

*Primary Examiner* — Amare F Tabor

(74) *Attorney, Agent, or Firm* — XSENSUS LLP

(57) ABSTRACT

A data communication system includes at least one data communication device, and a host device capable of communicating with the at least one data communication device. Each of the at least one data communication device transmits encryption information to the host device, the encryption information being related to an encryption scheme previously determined in correspondence with the data communication device. The host device receives the encryption information from each of the at least one data communication device. The host device and each of the at least one data communication device perform data communication with each other based on the encryption information.

20 Claims, 7 Drawing Sheets

(56)  References Cited

U.S. PATENT DOCUMENTS

| 2005/0193103 | A1* | 9/2005 | Drabik | ............... | H04L 63/0272 |
| | | | | | 709/221 |
| 2009/0100264 | A1* | 4/2009 | Futa | .................... | H04L 9/0844 |
| | | | | | 713/170 |
| 2016/0014100 | A1* | 1/2016 | Matsuo | .............. | H04L 63/0435 |
| | | | | | 713/169 |

* cited by examiner

FIG. 3

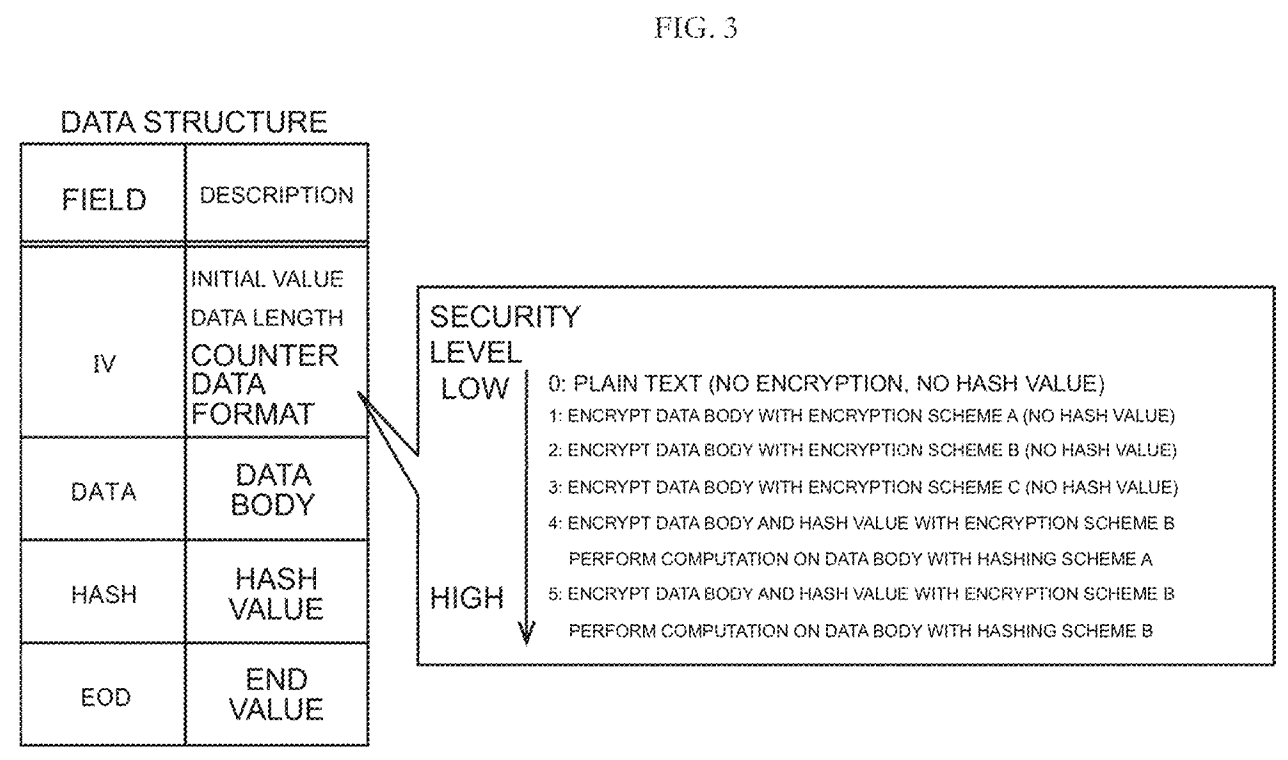

| DATA STRUCTURE | |
| --- | --- |
| FIELD | DESCRIPTION |
| IV | INITIAL VALUE |
| | DATA LENGTH |
| | COUNTER |
| | DATA FORMAT |
| DATA | DATA BODY |
| HASH | HASH VALUE |
| EOD | END VALUE |

SECURITY LEVEL

LOW

0: PLAIN TEXT (NO ENCRYPTION, NO HASH VALUE)

1: ENCRYPT DATA BODY WITH ENCRYPTION SCHEME A (NO HASH VALUE)

2: ENCRYPT DATA BODY WITH ENCRYPTION SCHEME B (NO HASH VALUE)

3: ENCRYPT DATA BODY WITH ENCRYPTION SCHEME C (NO HASH VALUE)

4: ENCRYPT DATA BODY AND HASH VALUE WITH ENCRYPTION SCHEME B
PERFORM COMPUTATION ON DATA BODY WITH HASHING SCHEME A

5: ENCRYPT DATA BODY AND HASH VALUE WITH ENCRYPTION SCHEME B
PERFORM COMPUTATION ON DATA BODY WITH HASHING SCHEME B

HIGH

FIG. 7

| DISTRIBUTION OF FUNCTIONS | DATA ACQUISITION | DATA COLLECTION | COMPUTATION USING DATA | CONTROL-DATA GENERATION BASED ON COMPUTATION PROCESS | OPERATION ACCORDING TO CONTROL DATA |
|---|---|---|---|---|---|
| PATTERN 1 | DATA COMMUNICATION DEVICE 10 | HOST DEVICE 20 | CENTRAL PROCESSING DEVICE 30 | CENTRAL PROCESSING DEVICE 30 | TERMINAL DEVICE 40 |
| PATTERN 2 | DATA COMMUNICATION DEVICE 10 | HOST DEVICE 20 | HOST DEVICE 20 | CENTRAL PROCESSING DEVICE 30 | TERMINAL DEVICE 40 |
| PATTERN 3 | DATA COMMUNICATION DEVICE 10 | HOST DEVICE 20 | HOST DEVICE 20 | HOST DEVICE 20 | TERMINAL DEVICE 40 |

DATA COMMUNICATION SYSTEM 1 (PATTERN A)

DATA COMMUNICATION SYSTEM 1 (PATTERN B)

DATA COMMUNICATION SYSTEM 1 (PATTERN C)

DATA COMMUNICATION SYSTEM 1 (PATTERN D)

DATA COMMUNICATION SYSTEM, DATA COMMUNICATION DEVICE, HOST DEVICE, DATA COMMUNICATION METHOD, AND DATA COMMUNICATION PROGRAM

CROSS-REFERENCE TO RELATED APPLICATION

The present application claims priority to Japanese Patent Application 2022-139893, filed on Sep. 2, 2022, the entire contents of which are incorporated herein by reference.

BACKGROUND

1. Field of the Disclosure

The present disclosure relates to a data communication system, a data communication device, a host device, a data communication method, and a data communication program.

2. Description of the Related Art

Data communication systems are known in the art in which a host device acquires data detected by a sensor, and transmits the acquired data to a central processing device. In such a data communication system, at least one sensor is connectable to the host device. The at least one sensor may, in some cases, include both a sensor that handles low-confidentiality data for the user, and a sensor that handles high-confidentiality data for the user.

In data communication, a higher security level is required for high-confidentiality data than for low-confidentiality data. Sensors capable of providing a high security level, however, are required to execute high-speed processing in, for example, data encryption. Accordingly, such a sensor typically incorporates a large and expensive processor, and may have increased power consumption. This may present a problem if, as with a sensor that handles high-confidentiality data, all sensors connected to the host device are to execute such an encryption process that ensures a high security level. In this case, even a sensor that handles low-confidentiality data needs to be equipped with a processor with over-designed specifications. Use of such an over-designed processor may lead to increased size, and power consumption of the overall data communication system. If the host device is to likewise execute high-speed processing in, for example, encryption of data communication with all of the sensors connected to the host device, this may lead to increased power consumption.

In this regard, Japanese Unexamined Patent Application Publication No. 2017-211850 discloses a system that, to render data detected by a sensor confidential with a low processing load, partially encrypts data acquired from the sensor.

The system disclosed in Japanese Unexamined Patent Application Publication No. 2017-211850 does not consider whether each individual sensor connected to a processing device is a sensor that handles low-confidentiality data or a sensor that handles high-confidentiality data. Rather, the system is configured such that all sensors connected to the processing device execute encryption at the same or similar security level. Accordingly, a problem similar to that mentioned above may also arise with the system disclosed in Japanese Unexamined Patent Application Publication No. 2017-211850 if, as with a sensor that handles high-confidentiality data, all sensors connected to the processing device are to execute such an encryption process that ensures a high security level. In this case, even a sensor that handles low-confidentiality data needs to be equipped with an over-designed processor. This may lead to increased size, cost, and power consumption of the overall system.

SUMMARY OF THE DISCLOSURE

The present disclosure is directed to addressing the above-mentioned problems. Accordingly, it is an object of the present disclosure to provide a technique capable of ensuring secure data communication while reducing increases in physical size, cost, and power consumption.

A data communication system according to an aspect of the present disclosure includes at least one data communication device, and a host device capable of communicating with the at least one data communication device. Each of the at least one data communication device transmits encryption information to the host device, the encryption information being related to an encryption scheme previously determined in correspondence with the data communication device. The host device receives the encryption information from each of the at least one data communication device. The host device and each of the at least one data communication device perform data communication with each other based on the encryption information.

A data communication device for communication with a host device according to another aspect of the present disclosure includes a controller, and a communication interface via which to communicate with a host device. The controller receives inquiry information from the host device, the inquiry information being related to an inquiry of an encryption scheme. The controller transmits encryption information to the host device in response to receiving the inquiry information, the encryption information being related to a previously determined encryption scheme. The controller performs, based on the encryption information, data communication with the host device.

A host device according to another aspect of the present disclosure includes a controller, and a communication interface via which to communicate with at least one data communication device. The controller transmits inquiry information to each of the at least one data communication device, the inquiry information being related to an inquiry of an encryption scheme previously determined in correspondence with the data communication device. The controller receives encryption information from each of the at least one data communication device, the encryption information being related to an encryption scheme corresponding to the data communication device. The controller performs, based on the encryption information, data communication with each of the at least one data communication device.

A data communication method according to another aspect of the present disclosure includes the steps of: receiving inquiry information from a host device, the inquiry information being related to an inquiry of an encryption scheme; transmitting encryption information to the host device in response to receiving the inquiry information, the encryption information being related to a previously determined encryption scheme; and performing, based on the encryption information, data communication with the host device.

A data communication method according to another aspect of the present disclosure includes the steps of: transmitting inquiry information to each of at least one data communication device, the inquiry information being related to an inquiry of an encryption scheme previously determined in correspondence with the data communication device; receiving encryption information from each of the at least one data communication device, the encryption information being related to an encryption scheme corresponding to the data communication device; and performing, based on the encryption information, data communication with each of the at least one data communication device.

According to the present disclosure, the host device and each of the at least one data communication device perform data communication with each other based on encryption information related to an encryption scheme previously determined in correspondence with the data communication device. This means that each of the at least one data communication device may simply be equipped with a controller capable of executing an encryption process adapted to a security level set for the data communication device. Accordingly, as compared with equipping all data communication devices with a controller capable of executing an encryption process adapted to the highest security level, the above-mentioned configuration makes it possible to ensure secure data communication while reducing increases in the size, cost, and power consumption of the overall data communication system. The above-mentioned configuration also obviates the need for the host device to execute high-speed processing in, for example, encryption of data communication with all data communication devices connected to the host device. This helps to reduce an increase in power consumption.

BRIEF DESCRIPTION OF THE DRAWINGS

FIG. 3 is an illustration for explaining the structure of data transmitted and received between a host device and a data communication device;

FIG. 7 illustrates an example of the distribution of functions in the data communication system.

DESCRIPTION OF THE PREFERRED EMBODIMENTS

Figure 1:
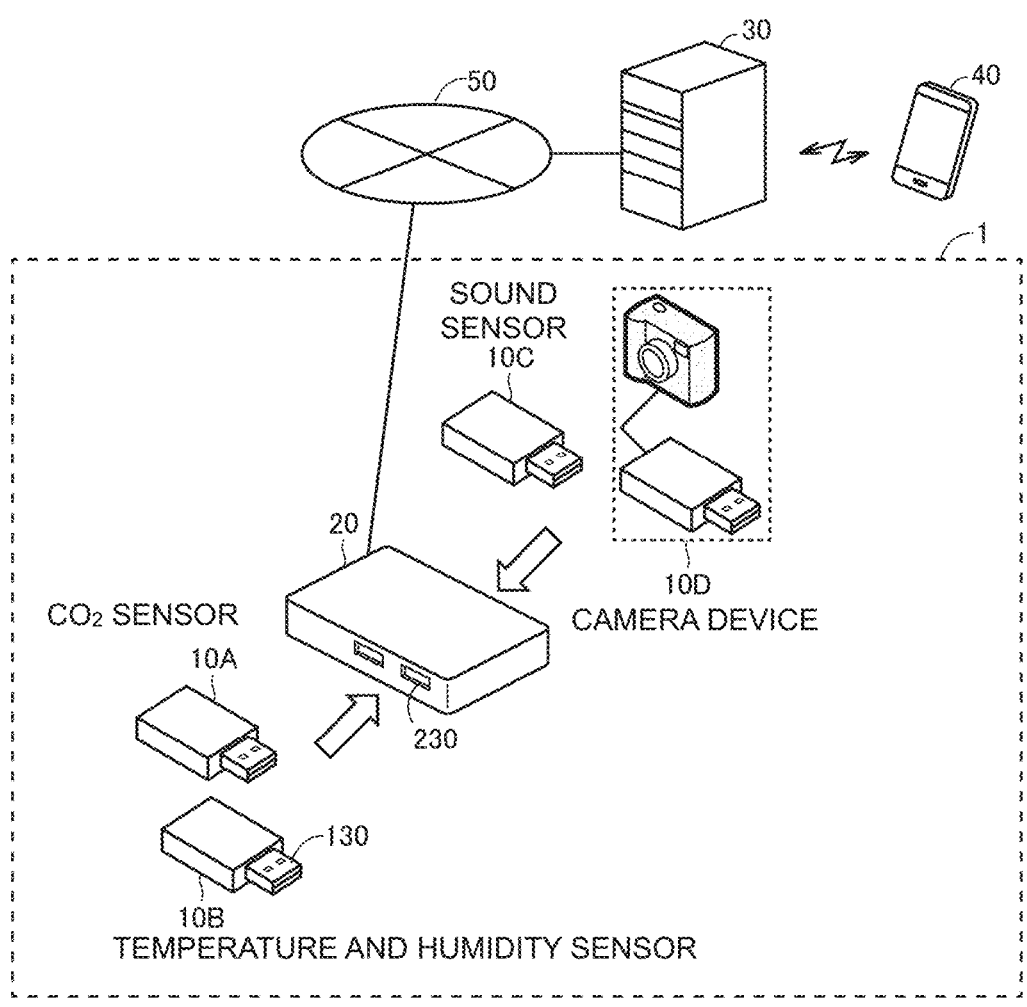
FIG. 1 illustrates an overview of a data communication system according to an embodiment.

Embodiments of the present disclosure will be described below in detail with reference to the drawings. In the drawings, identical or corresponding features will be designated by the same reference signs, and descriptions of such features will not be repeated.

Overview of Data Communication System

An overview of a data communication system 1 according to an embodiment is described below with reference to FIG. 1. FIG. 1 illustrates an overview of the data communication system 1 according to the embodiment.

As illustrated in FIG. 1, the data communication system 1 includes at least one data communication device 10A, 10B, 10C, or 10D (hereinafter also referred to collectively as "data communication devices 10" or "data communication device 10"), and a host device 20.

The at least one data communication device 10 is a device that detects data, and transmits the data that has been detected (hereinafter also referred to as "detected data") to the host device 20. For example, in the example illustrated in FIG. 1, the data communication device 10A is a $CO_2$ sensor capable of detecting carbon dioxide (to be hereinafter referred to also as "$CO_2$") in a target space where the data communication device 10A is disposed. The data communication device 10A transmits the detected $CO_2$ data to the host device 20. The data communication device 10B is a temperature and humidity sensor capable of detecting temperature and humidity in a target space where the data communication device 10B is disposed. The data communication device 10B transmits the detected temperature and humidity data to the host device 20. The data communication device 10C is a sound sensor capable of detecting sound (e.g., human voice) produced in a target space where the data communication device 10C is disposed. The data communication device 10C transmits the detected sound data to the host device 20. The data communication device 10D is a camera device including a camera capable of capturing an image of an object (examples of which include a human and a physical entity) in a target space where the data communication device 10D is disposed. The data communication device 10D transmits image data obtained through the image capture to the host device 20.

The data communication device 10 may be a device capable of detecting not only $CO_2$, temperature, humidity, sound, or image but all kinds of data in a target space where the data communication device 10 is disposed, such as air pressure, acceleration, angular velocity, or illuminance. In the example illustrated in FIG. 1, a single host device 20 is connected with four data communication devices. Alternatively, however, a single host device 20 may be connected with a single data communication device, or may be connected with another number of data communication devices. At least one data communication device 10 connected to a single host device 20 may each be capable of detecting the same kind of data, or may each be capable of detecting a different kind of data.

The data communication device 10 is communicably connected to the host device 20. For example, the data communication device 10 includes a plug connector 130 that is compliant with the Universal Serial Bus (USB) standard. The host device 20 includes a receptacle connector 230 that is compliant with the USB standard. Insertion of the plug connector 130 into the receptacle connector 230 of the host device 20 allows the data communication device 10 to communicate data with the host device 20 via a USB connection.

The data communication device 10 and the host device 20 may be capable of data communication via not only a USB connection but also a wireless connection such as Bluetooth (registered trademark). The data communication system 1 may include both at least one data communication device 10 that makes a USB connection to the host device 20, and at least one data communication device 10 that makes a wireless connection to the host device 20.

As compared with using a wireless connection to allow communication between the data communication device 10 and the host device 20, using a USB connection to allow the communication helps to reduce loss of data being communicated, and also eliminates the need for settings required for establishing a wireless connection. The data communication device 10 is also capable of receiving electric power from the host device 20 via the USB connection.

Using a wireless connection to allow communication between the data communication device 10 and the host device 20 enables data communication to be performed with the data communication device 10 being placed at a location physically remote from the host device 20. Accordingly, as compared with using a USB connection to allow communication between the data communication device 10 and the host device 20, using a wireless connection to allow communication between the data communication device 10 and the host device 20 makes it possible to increase the freedom of where to place the data communication device 10.

The host device 20 acquires data transmitted from each of the at least one data communication device 10 communicably connected to the host device 20. The host device 20 is capable of wireless communication with a central processing device 30 via a network 50. For example, the host device 20 may connect to the network 50 via an access point (not illustrated) by means of a Wi-Fi (registered trademark) connection, or may connect to the network 50 by means of a cellular connection such as Long Term Evolution (LTE) or 5G. The host device 20 transmits data acquired from the data communication device 10 to the central processing device 30 via the network 50.

The host device 20 and the central processing device 30 may be capable of data communication via not only a wireless connection but also a wired connection. Further, the host device 20 may also serve as the central processing device 30.

The central processing device 30 accumulates data acquired via the host device 20 from the data communication device 10. The central processing device 30 also executes processing such as calculation or analysis using the data, and transmits control data based on the processing results to a terminal device 40. For example, the central processing device 30 analyzes temporal changes in $CO_2$ concentration in a target space by use of $CO_2$ data acquired from the data communication device 10, and transmits, to the terminal device 40, control data for displaying the analysis results. The central processing device 30 may be a server or a cloud, or may be integrated with the host device 20 to constitute a personal computer (PC) or a terminal device.

The terminal device 40 is an information terminal that executes predetermined information processing. Examples of the information terminal include a desktop PC, a laptop PC, a smartphone, a smartwatch, a wearable device, and a tablet PC. For example, based on control data transmitted from the central processing device 30, the terminal device 40 displays, on a display (not illustrated), temporal changes in $CO_2$ concentration in a target space.

Configuration of Data Communication System

Figure 2:
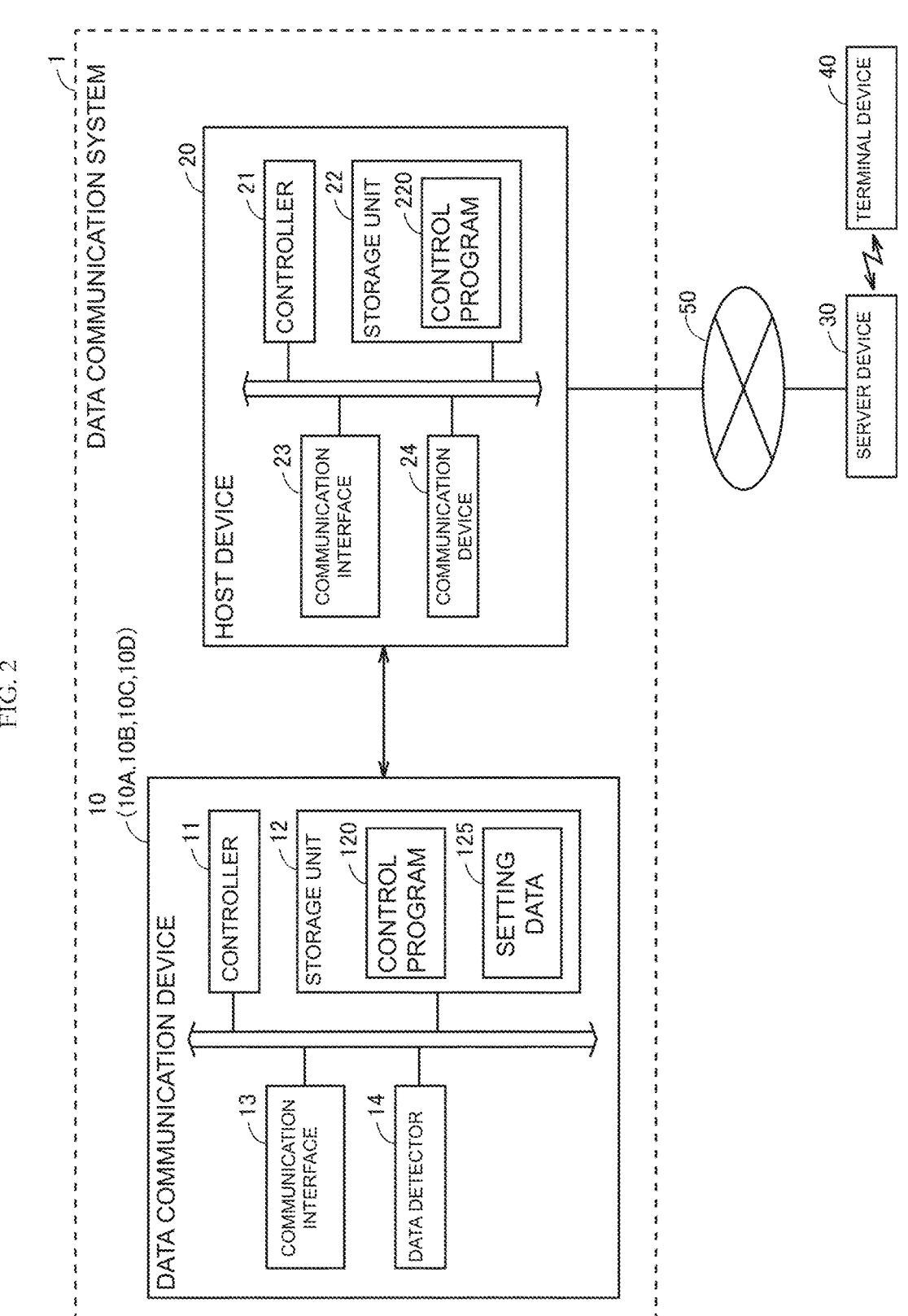
FIG. 2 illustrates a configuration of the data communication system according to the embodiment.

A configuration of the data communication system 1 according to the embodiment is described below in detail with reference to FIG. 2. FIG. 2 illustrates a configuration of the data communication system 1 according to the embodiment.

As illustrated in FIG. 2, the data communication device 10 includes a controller 11, a storage unit 12, a communication interface 13, and a data detector 14.

The controller 11 is a computer such as a processor. The processor is, for example, a microcontroller, a central processing unit (CPU), or a micro-processing unit (MPU). The processor is capable of executing various functions by executing a program. Some or all of these functions may be implemented by use of dedicated hardware circuitry, such as an application specific integrated circuit (ASIC) or a field-programmable gate array (FPGA). The term "processor" is not limited to a processor in the strict sense that executes processing with a stored-program scheme, such as a CPU or an MPU, but may include hard-wired circuitry such as an ASIC or an FPGA. Accordingly, a processor can be also read as "processing circuitry" that executes processes previously defined by computer-readable codes and/or hard-wired circuitry. The controller 11 may be implemented by a single chip, or may be implemented by multiple chips.

The storage unit 12 includes a random access memory (RAM) and a storage device. The RAM is a volatile memory such as a dynamic random access memory (DRAM) or a static random access memory (SRAM). The RAM serves as a working memory for temporarily storing data being processed by the processor. The RAM may be included in the controller 11, or may be disposed in a location separate from the controller 11. The storage device is a non-volatile memory such as a read only memory (ROM) or a flash memory. The storage device stores a program, or various data to be used by the program.

In the data communication device 10 according to the embodiment, the storage unit 12 stores a control program 120, and setting data 125. The control program 120 corresponds to an example of "data communication program." The control program 120 is executable by the controller 11. The control program 120 defines a procedure (e.g., processes illustrated in FIGS. 4 to 6 described later) related to detection of data in a target space and to transmission and reception of data to and from the host device 20. The data communication device 10 may acquire, from a recording medium such as a memory card or a Universal Serial Bus (USB) memory, the control program 120 stored in the recording medium. The setting data 125 includes information related to detection of data in a target space and to transmission and reception of data to and from the host device 20 (e.g., encryption information described later and hashing information described later).

The communication interface 13 is an interface for communicating data with the host device 20 via a USB connection or via a wireless connection such as Bluetooth.

The data detector 14 may include a component such as a sensor for detecting various data such as $CO_2$, temperature, humidity, sound, and image.

The host device 20 includes a controller 21, a storage unit 22, a communication interface 23, and a communication device 24.

The controller 21 is a computer such as a processor. The controller 21 is similar in configuration to the controller 11 of the data communication device 10. The processor is implemented by, for example, a microcontroller, a CPU, an MPU, an ASIC, or an FPGA, and can be also read as "processing circuitry." The controller 21 may be implemented by a single chip, or may be implemented by multiple chips.

The storage unit 22 includes a RAM (DRAM or SRAM), and a storage device (ROM or flash memory). The storage unit 22 is similar in configuration to the storage unit 12 of the data communication device 10.

In the host device 20 according to the embodiment, the storage unit 22 stores a control program 220. The control program 220 corresponds to an example of "data communication program." The control program 220 is executable by the controller 21. The control program 220 defines a procedure (e.g., processes illustrated in FIGS. 4 to 6 described later) related to transmission and reception of data to and from the data communication device 10. The host device 20 may acquire, from a recording medium such as a memory card or a USB memory, the control program 220 stored in the recording medium.

The communication interface 23 is an interface for communicating data with the data communication device 10 via a USB connection or via a wireless connection such as Bluetooth.

The communication device 24 is capable of performing wireless communication with the central processing device 30 via the network 50.

The data communication system 1 configured as described above allows data to be communicated between the data communication device 10 and the host device 20, and allows data detected by the data communication device 10 to be transmitted to the central processing device 30 via the host device 20.

The at least one data communication device 10 connectable to the host device 20 may include both a data communication device 10 that handles low-confidentiality data for the user, and a data communication device 10 that handles high-confidentiality data for the user. For example, as compared with $CO_2$ data to be detected by the data communication device 10A, and temperature and humidity data to be detected by the data communication device 10B, sound data to be detected by the data communication device 10C, and image data to be detected by the data communication device 10D are more likely to be related to the privacy of a person who is present in a target space, or more likely to contain secret information. Accordingly, from the viewpoint of protecting the privacy of a person who is present in a target space or protecting secret information, the security level in data communication needs to be set higher for the sound data to be transmitted from the data communication device 10C to the host device 20, and the image data to be transmitted from the data communication device 10D to the host device 20, than for the $CO_2$ data to be transmitted from the data communication device 10A to the host device 20, and the temperature and humidity data to be transmitted form the data communication device 10B to the host device 20.

Now, a case is considered where the host device 20 is to execute an encryption process such that, in accordance with the security level provided for the data communication device 10C and the data communication device 10D, which handle high-confidentiality data, a high security level is provided also for the data communication device 10A and the data communication device 10B, which handle low-confidentiality data. In this case, even the data communication device 10A and the data communication device 10B, which handle low-confidentiality data, need to be equipped with an over-designed controller 11. This may lead to increased size, cost, and power consumption of the overall data communication system 1. Likewise, as for the host device 20, if the host device 20 is to execute high-speed processing in, for example, encryption of data communication with all of the data communication devices 10 connected to the host device 20, this may lead to increased power consumption.

Accordingly, in the data communication system 1, the following pieces of information are previously determined for each of the at least one data communication device 10 connected to the host device 20: whether to perform encryption on data; the encryption scheme to be used if encryption is to be performed; whether to assign a hash value to data; and the hashing scheme to be used if a hash value is to be assigned. The host device 20, and each of the at least one data communication device 10 communicate data with each other by use of an encryption scheme corresponding to the data communication device 10, or communicate data with each other by use of a hashing scheme corresponding to the data communication device 10.

As described above, the host device 20, and each of the at least one data communication device 10 communicate data with each other by using an encryption scheme and a hashing scheme that are previously determined for the data communication device 10. This means that each of the at least one data communication device 10 may simply be equipped with a controller 11 capable of executing an encryption process adapted to a security level set for the data communication device 10. In other words, the data communication device 10A and the data communication device 10B, which handle low-confidentiality data, do not need to be equipped with a controller 11 with over-designed specifications adapted to the data communication device 10C and the data communication device 10D, which handle high-confidentiality data. This helps to reduce unnecessary increases in performance, cost, and power consumption. Therefore, as opposed to equipping the data communication device 10A and the data communication device 10B, which handle low-confidentiality data, with a controller 11 capable of executing an encryption process adapted to a security level required for the data communication device 10C and the data communication device 10D, which handle high-confidentiality data, the above-mentioned configuration makes it possible to ensure secure data communication while reducing increases in the size, cost, and power consumption of the overall data communication system 1. The above-mentioned configuration also obviates the need for the host device 20 to execute high-speed processing in, for example, encryption of data communication with all of the data communication devices 10 connected to the host device 20. This helps to reduce an increase in power consumption.

Example of Data Structure

The structure of data to be transmitted and received between the host device 20 and the data communication device 10 is described below with reference to FIG. 3. FIG. 3 is an illustration for explaining the structure of data transmitted and received between the host device 20 and the data communication device 10. With reference to FIG. 3, the structure of data to be transmitted from the data communication device 10 to the host device 20, and the structure of data to be transmitted from the host device 20 to the data communication device 10 are collectively described.

As illustrated in FIG. 3, the data structure includes fields each representing a data item, and descriptions of data corresponding to individual fields. The fields include Initial Value (IV), DATA, HASH, and End of Data (EOD).

IV includes an initial value, a data length, a counter, and a data format. The data length, the counter, and the data format may be included in a field different from the initial value rather than in IV.

The initial value is a random value representing the initial value of data to be transmitted in a single transmission. The initial value includes, for example, 16 bytes, and is used for encryption of data. The data length represents the effective number of bytes of the data body. For example, the data body includes 16*N bytes (N is a natural number). The counter is a value that is incremented every time data is transmitted. The counter is used to ensure that the recipient will not receive data that overlaps previously received data, or to determine the presence of a fault in data due to a data reception error described later.

The data format includes encryption information and hashing information that are previously determined in correspondence with the data communication device 10. The encryption information is related to an encryption scheme.

The hashing information is related to a hashing scheme. The encryption information includes information indicating whether to perform encryption on data, and what encryption scheme to use if encryption is to be performed. The hashing information includes information indicating whether to perform computation on IV and the data body with a hashing scheme, and what hashing scheme to use if computation is to be performed.

For example, the data format has six identifiers numbered from "0" to "5" in order of increasing security level. The data format includes encryption information and hashing information in correspondence with each of the six identifiers. The identifier "0" indicates that the corresponding encryption process and the corresponding computation process using a hashing scheme are the least complex, and that the corresponding security level is the lowest. The identifier "5" indicates that the corresponding encryption process and the corresponding computation process using a hashing scheme are the most complex and that the corresponding security level is the highest.

Specifically, if the data format indicates "0", the data body does not undergo encryption, and IV and the data body are transmitted in plain text without undergoing computation with a hashing scheme. No hash value is assigned to the data to be transmitted and received.

If the data format indicates "1", the data body undergoes encryption with Encryption Scheme A, and IV and the data body are transmitted without undergoing computation with a hashing scheme. No hash value is assigned to the data to be transmitted and received. An example of Encryption Scheme A is an encryption scheme that employs a Rivest Cipher 4 (RC4) (registered trademark) encryption algorithm to encrypt data by use of a common key with a size of 40 to 256 bits. No hash value is assigned to the data to be transmitted and received.

If the data format indicates "2", the data body undergoes encryption with Encryption Scheme B, and IV and the data body are transmitted without undergoing computation with a hashing scheme. No hash value is assigned to the data to be transmitted and received. An example of Encryption Scheme B is an encryption scheme that employs an Advanced Encryption Standard (AES) encryption algorithm to encrypt data by use of a 128-bit common key.

If the data format indicates "3", the data body undergoes encryption with Encryption Scheme C, and IV and the data body are transmitted without undergoing computation with a hashing scheme. No hash value is assigned to the data to be transmitted and received. An example of Encryption Scheme C is an encryption scheme that employs an AES encryption algorithm to encrypt data by use of a 256-bit common key.

If the data format indicates "4", IV and the data body undergo computation with Hashing Scheme A, and the data body and a hash value obtained by the computation with Hashing Scheme A are encrypted with Encryption Scheme B before being transmitted. An example of Hashing Scheme A is a hashing scheme that employs MessageDigest Algorithm 5 (MD5) as a hash function in performing computation on data.

If the data format indicates "5", IV and the data body undergo computation with Hashing Scheme B, and the data body and a hash value obtained by the computation with Hashing Scheme B are encrypted with Encryption Scheme B before being transmitted. An example of Hashing Scheme B is a hashing scheme that employs a Secure Hash Algorithm 256 (SHA256) hash function in performing computation on data.

As described above, the data format specifies that, for the identifier "0" corresponding to the lowest security level, data is to be transmitted in plain text without encryption and without being assigned a hash value. The data format also specifies that, with higher security levels required, encryption and assigning of a hash value are executed as appropriate and, further, the security level of encryption is increased.

Examples of the encryption and hashing schemes to be specified in the data format are not limited to those in the data structure illustrated in FIG. 3, but may include other encryption and hashing schemes. Suitable examples of the encryption scheme may include not only a common-key encryption scheme but also a public-key encryption scheme, or may include a hybrid-key encryption scheme that combines a common-key encryption scheme and a public-key encryption scheme.

According to the embodiment, examples of data communication based on encryption information include a case where the data body is transmitted and received in plain text without undergoing encryption, and a case where the data body is transmitted and received after being encrypted with a predetermined encryption scheme. Examples of data communication based on hashing information include a case where IV and the data body are transmitted and received without undergoing computation with a hashing scheme, and a case where IV and the data body are transmitted and received after undergoing computation with a hashing scheme and being assigned a hash value obtained as a result of the computation.

DATA represents the data body. HASH represents a hash value obtained by computation performed on data with a hashing scheme specified in the data format. The hash value is used to detect whether data has been tampered with. End of Data (EOD) is a fixed value representing the end of data transmitted in a single transmission.

Example of Data Communication

Figure 4:
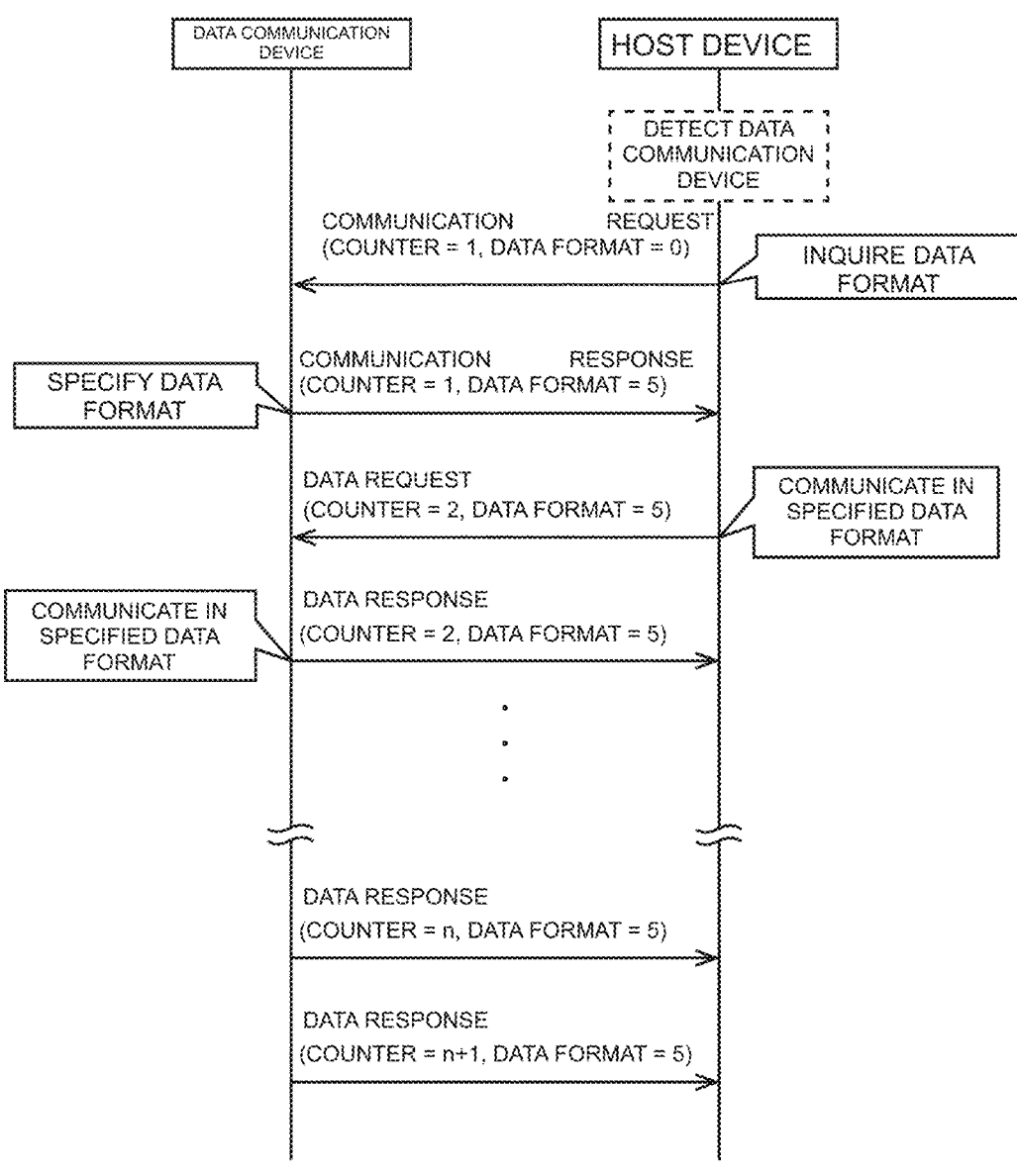
FIG. 4 illustrates an example of data communication to be executed by the host device and the data communication device.

Data communication to be executed by the host device 20 and the data communication device 10 is described below with reference to FIG. 4. FIG. 4 illustrates an example of data communication to be executed by the host device 20 and the data communication device 10. The data communication device 10 executes, through execution of the control program 120 by the controller 11, processes related to data communication illustrated in FIG. 4 and in FIGS. 5 and 6 described later. The host device 20 executes, through execution of the control program 220 by the controller 21, processes related to data communication illustrated in FIG. 4 and in FIGS. 5 and 6 described later.

FIG. 4 illustrates a process related to data communication that is executed in response to the host device 20 detecting the data communication device 10. As the plug connector 130 of the data communication device 10 is inserted into the receptacle connector 230 of the host device 20, the data communication device 10 is detected by the host device 20 as illustrated in FIG. 4.

Upon detecting the data communication device 10, the host device 20 requests the data communication device 10 to communicate with the host device 20. Specifically, the host device 20 transmits inquiry information to the data communication device 10. The inquiry information is related to an inquiry about the data format (encryption information and hashing information). At this time, in the data representing the inquiry information related to the communication request made from the host device 20 to the data communication device 10, command data for making the communication request is set in the data body, "1" is set in the counter to indicate that the current transmission is the first transmission, and "0" is set in the data format. That is, at the point when a request for data communication is made for the first time from the host device 20 to the data communication device 10, the host device 20 has not yet been notified of the data format (encryption information and hashing information) from the data communication device 10. Accordingly, the host device 20 transmits data related to the communication request in plain text, and inquires the data format (encryption information and hashing information).

Upon receiving, from the host device 20, inquiry information related to the communication request, the data communication device 10 makes a response to the communication request. At this time, in the data related to the communication response made from the data communication device 10 to the host device 20, the data body contains command data for responding to the communication, "1" is set in the counter to indicate that the current transmission is the first transmission, and "5" is set in the data format. That is, when responding to the communication request made from the host device 20, the data communication device 10 specifies, in the data format, encryption information and hashing information that are previously determined in correspondence with the data communication device 10. Based on the encryption information and the hashing information, the data communication device 10 encrypts data related to the communication response, and assigns a hash value before transmitting the resulting data. In the data communication device 10, encryption information and hashing information to be specified for the host device 20 are pre-stored in the storage unit 12 as the setting data 125.

In the example in FIG. 4, the data communication device 10 sets "5" in the data format, encrypts data related to the communication response with Encryption Scheme B, performs computation with Hashing Scheme B on IV and the data body that are related to the communication response, and assigns the resulting hash value before transmitting the resulting data to the host device 20. Accordingly, when the host device 20 receives data from the data communication device 10, the host device 20 is able to, by referencing the data format contained in IV of the received data, encryption information and hashing information that correspond to the data communication device 10. In the case of the present example, the host device 20 is able to recognize that, for a data communication device 10 with which the host device 20 is to communicate, data communication is to be performed by use of an encryption scheme and a hashing scheme that correspond to the data format "5."

Although not illustrated, if, for example, the data communication device 10 is one that handles low-confidentiality data, such as the data communication device 10A or the data communication device 10B, then the data communication device 10 sets, in the data format, "1" or "2" corresponding to encryption information and hashing information with a relatively low security level. If the data communication device 10 is one that handles high-confidentiality data, such as the data communication device 10C or the data communication device 10D, then the data communication device 10 sets, in the data format, "4" or "5" corresponding to encryption information and hashing information with a relatively high security level. The above-mentioned configuration allows the host device 20 to recognize that, for each of the at least one data communication device 10 with which the host device 20 is to communicate, data communication is to be performed by use of an encryption scheme and a hashing scheme that are previously determined in correspondence with the data communication device 10.

Upon receiving data related to the communication response from the data communication device 10, the host device 20 requests the data communication device 10 for data that has been detected by the data communication device 10. At this time, in the data related to the data request made from the host device 20 to the data communication device 10, the data body contains command data for making the data request, "2" is set in the counter to indicate that the current transmission is the second transmission, and "5" is set in the data format. That is, when requesting the data communication device 10 for detected data, the host device 20 encrypts data related to the data request and/or assigns a hash value, based on encryption information and hashing information that correspond to the data format "5" that has been specified by the data communication device 10 during the communication response. The host device 20 then transmits the resulting data.

Upon detecting data related to the data request from the host device 20, the data communication device 10 transmits detected data to the host device 20 as a data response. At this time, in the data related to the data response made from the data communication device 10 to the host device 20, the data body contains the detected data, "2" is set in the counter to indicate that the current transmission is the second transmission, and "5" is set in the data format. That is, in transmitting detected data to the host device 20, the data communication device 10 encrypts the detected data and assigns a hash value, based on encryption information and hashing information that correspond to the data format "5" that has been specified for the data communication device 10 during the communication response. The data communication device 10 then transmits the resulting data.

At this time, the host device 20 permits acceptance of data only if the data received by the host device 20 meets the following conditions: the data has been encrypted based on encryption information corresponding to the data format "5" specified by the data communication device 10 during the communication response; and the data has been assigned a hash value obtained as a result of computation with a hashing scheme based on hashing information corresponding to the data format "5." The host device 20 inhibits acceptance of data if the data received by the host device 20 meets one of the following conditions: the data has been transmitted in plain text; the data has been encrypted with an encryption scheme different from that specified in encryption information corresponding to the data format "5" specified by the data communication device 10 during the communication response; and the data has a hash value different from that transmitted from the data communication device 10, the hash value being obtained as a result of computation performed on IV and the data body with a hashing scheme corresponding to the data format "5."

If, during the data request made to the data communication device 10, the host device 20 has requested the data communication device 10 to periodically transmit detected data at predetermined intervals of time, the data communication device 10 periodically transmits detected data at predetermined intervals of time to the host device 20 as a data response.

For example, the data communication device 10 measures the time that has elapsed since the (n−1)th transmission of detected data. When the measured time reaches a predetermined time, the data communication device 10 detects data again, and transmits the detected data to the host device 20 as the n-th data response. At this time, in the data related to the data response made from the data communication device 10 to the host device 20, the data body contains the n-th detected data, "n" is set in the counter to indicate that the current transmission is the n-th transmission, and "5" is set in the data format.

Further, the data communication device 10 measures the time that has elapsed since the n-th transmission of detected data. When the measured time reaches a predetermined time, the data communication device 10 detects data again, and transmits the detected data to the host device 20 as the (n+1)th data response. At this time, in the data related to the data response made from the data communication device 10 to the host device 20, the data body contains the (n+1)th detected data, "n+1" is set in the counter to indicate that the current transmission is the (n+1)th transmission, and "5" is set in the data format.

In this way, the data communication device 10 periodically transmits detected data in response to a data request made from the host device 20. The detected data transmitted at this time has been encrypted with an encryption scheme corresponding to the data format "5" previously determined in correspondence with the data communication device 10, and has been assigned a hash value obtained as a result of computation with a hashing scheme corresponding to the data format "5."

Upon receiving and accepting detected data periodically transmitted from the data communication device 10, the host device 20 transmits the detected data thus acquired to the central processing device 30 via the network 50. The detected data is encrypted with a specific encryption scheme such as Hypertext Transfer Protocol Secure (HTTPS) for communication between the host device 20 and the central processing device 30. That is, upon acquiring detected data from each of the at least one data communication device 10, the host device 20 performs encryption on the detected data with a specific encryption scheme previously determined irrespective of the at least one data communication device 10, and then transmits the encrypted data to the central processing device 30.

In this way, in acquiring detected data from each of the at least one data communication device 10 connected to the host device 20, the central processing device 30 is able to acquire the detected data after the detected data is encrypted with a specific predetermined encryption scheme. This means that the central processing device 30 may simply execute the same decryption process for any detected data acquired, irrespective of the data communication device 10 from which the detected data has been acquired. This leads to reduced processing load associated with the decryption.

The host device 20 may transmit detected data acquired from each of the at least one data communication device 10 to the central processing device 30, with the detected data being encrypted with a predetermined encryption scheme by the data communication device 10. That is, the host device 20 may transmit detected data acquired from each of the at least one data communication device 10 to the central processing device 30 directly without decryption and encryption.

Accordingly, even when the host device receives data one after another from each of the at least one data communication device 10, the host device may simply transmit the received data directly to the central processing device 30. This leads to reduced processing load associated with decryption and encryption.

As described above, the host device 20, and each of the at least one data communication device 10 communicate data with each other by using an encryption scheme and a hashing scheme that are previously determined for the data communication device 10. This means that each of the at least one data communication device 10 may simply be equipped with a controller 11 capable of executing an encryption process adapted to a security level set for the data communication device 10. As compared with equipping all data communication devices 10 with a controller 11 capable of executing an encryption process adapted to the highest security level, the above-mentioned configuration makes it possible to ensure secure data communication while reducing increases in size, cost, and power consumption.

The host device 20 is capable of, for each of the at least one data communication device 10 connected to the host device 20, executing an encryption process according to the security level of the data communication device 10, and assigning a hash value obtained as a result of computation with a hashing scheme. This allows for flexible adaptation to data communication devices 10 with varying security levels. This also obviates the need for the host device 20 to execute high-speed processing in, for example, encryption of data communication with all of the data communication devices 10 connected to the host device 20. This helps to reduce an increase in power consumption.

The data communication device 10 may simply include a controller 11 suited for a predetermined security level. In particular, for data communication devices 10 such as sensors for which no security is required, an inexpensive and compact controller 11 may be used. This helps to reduce the cost and power consumption of such a data communication device 10 as well.

As described above, the host device 20 encrypts data and assigns a hash value in accordance with encryption information and hashing information that have been specified from the data communication device 10. At this time, it is not possible to specify an encryption scheme and a hashing scheme from the host device 20. It is thus impossible for an encryption scheme and a hashing scheme to be specified for the data communication device 10 from an illegitimate host device masquerading as a legitimate host device 20. This makes it possible to ensure the confidentiality of data in data communication between the host device 20 and the data communication device 10.

Example of Data Retransmission

Figure 5:
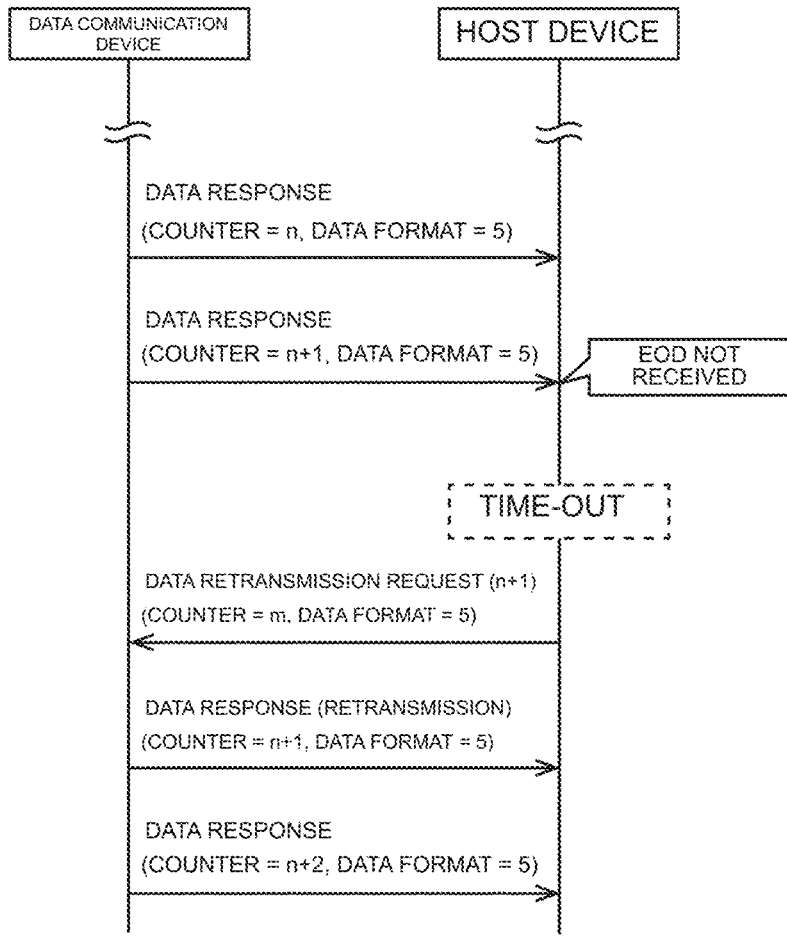
FIG. 5 illustrates an example of retransmission of data from the data communication device to the host device.

Retransmission of data from the data communication device 10 to the host device 20 is described below with reference to FIG. 5. FIG. 5 illustrates an example of retransmission of data from the data communication device 10 to the host device 20.

As described above, in the data communication system 1, the host device 20 is configured to periodically receive detected data from the data communication device 10. In this regard, there may be situations where, due to some abnormality, the host device 20 fails to receive detected data from the data communication device 10.

For example, as illustrated in FIG. 5, after transmitting detected data to the host device 20 as the n-th data response, the data communication device 10 transmits detected data to the host device 20 as the (n+1)th data response after elapse of a predetermined amount of time. In some cases, the host device 20 may, due to some abnormality, fail to correctly receive the (n+1)th data response at this time. In such cases, the host device 20 requests the data communication device 10 to retransmit the (n+1)th detected data.

Specifically, when a time-out occurs without the host device 20 receiving the EOD of data related to the (n+1)th data response transmitted form the data communication device 10, the host device 20 transmits, to the data communication device 10, request information that requests retransmission of the (n+1)th detected data. At this time, in the data representing the request information related to the data retransmission request made from the host device 20 to the data communication device 10, command data for requesting retransmission of the (n+1)th detected data is contained, "m" is set in the counter to indicate that the current transmission is the m-th transmission, and "5" is set in the data format. That is, when requesting the data communication device 10 to retransmit detected data, the host device 20 encrypts data related to the data retransmission request and assigns a hash value, based on encryption information and hashing information that correspond to the data format "5" that has been specified by the data communication device 10 during the communication response. The host device 20 then transmits the resulting data.

Upon detecting the request information related to the data retransmission request from the host device 20, the data communication device 10 retransmits the (n+1)th detected data to the host device 20. At this time, in the data related to retransmission of a data response from the data communication device 10 to the host device 20, the data body contains the (n+1)th detected data, "n+1" is set in the counter to indicate that the current transmission is the (n+1)th transmission, and "5" is set in the data format. That is, in retransmitting detected data to the host device 20, the data communication device 10 encrypts the detected data and assigns a hash value, based on encryption information and hashing information that correspond to the data format "5" that has been specified for the data communication device 10 during the communication response. The data communication device 10 then retransmits the resulting data.

Subsequently, when the time elapsed from the retransmission of the (n+1)th detected data reaches a predetermined time, the data communication device 10 detects data again, and transmits the detected data to the host device 20 as the (n+2)th data response. At this time, in the data related to the data response made from the data communication device 10 to the host device 20, the data body contains the (n+2)th detected data, "n+2" is set in the counter to indicate that the current transmission is the (n+2)th transmission, and "5" is set in the data format.

In this way, if the host device 20 fails to receive detected data from the data communication device 10, the host device 20 requests the data communication device 10 to retransmit detected data. The host device 20 is thus able to acquire detected data from the data communication device 10 again. This allows the host device 20 to acquire detected data transmitted from the data communication device 10, without missing or loss of the data.

Another Example of Data Retransmission

Figure 6:
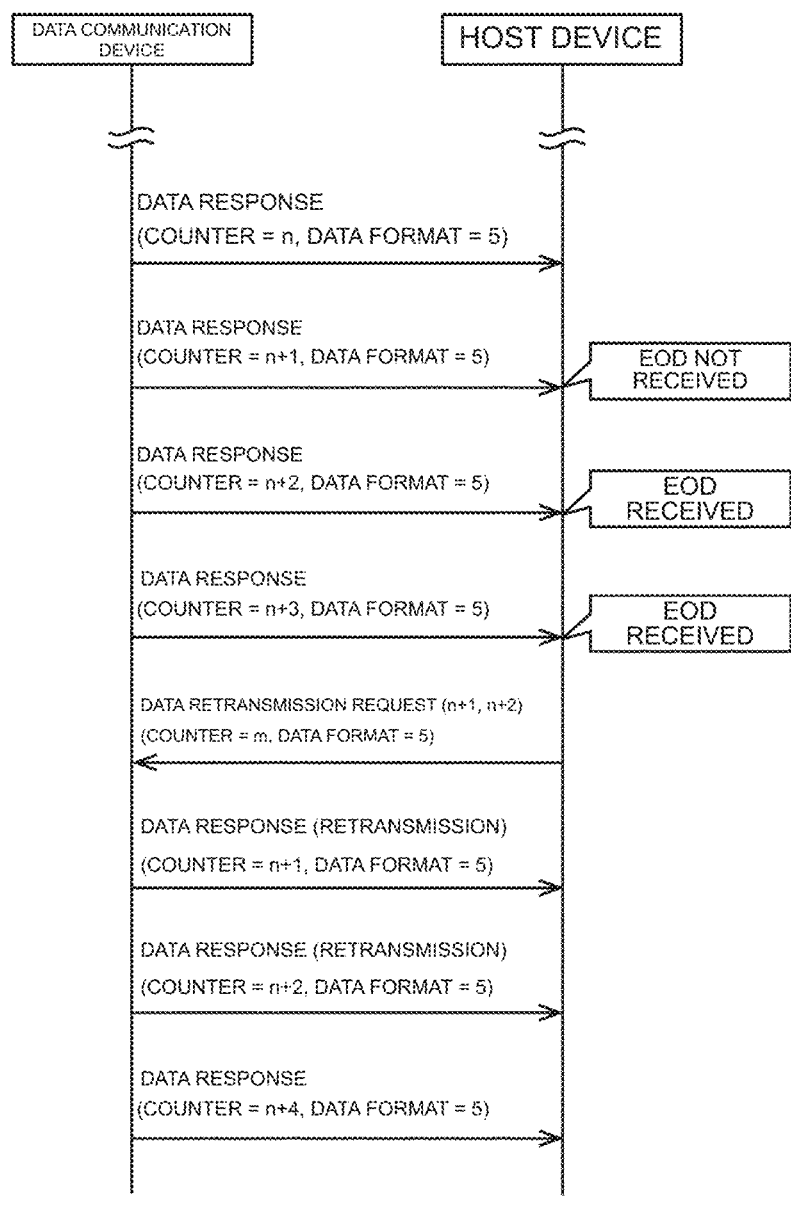
FIG. 6 illustrates another example of retransmission of data from the data communication device to the host device.

Another example of retransmission of data from the data communication device 10 to the host device 20 is described below with reference to FIG. 6. FIG. 6 illustrates another example of retransmission of data from the data communication device 10 to the host device 20.

As illustrated in FIG. 6, after transmitting detected data to the host device 20 as the n-th data response, the data communication device 10 transmits detected data to the host device 20 as the (n+1)th data response after elapse of a predetermined amount of time. In some cases, the host device 20 may, due to some abnormality, fail to correctly receive the (n+1)th data response but succeeds to correctly receive the next (n+2)th data response. In such cases, the host device 20 requests the data communication device 10 to retransmit the (n+1)th detected data and the (n+2)th detected data.

Specifically, the host device 20 transmits, to the data communication device 10, request information that requests retransmission of the (n+1)th detected data and the (n+2)th detected data if the following condition is met: the host device 20 has received, without receiving the EOD of data related to the (n+1)th data response transmitted form the data communication device 10, the EOD of data related to the next (n+2)th data response, and has received the EOD of data related to the further next (n+3)th data response. The host device 20 regards the (n+3)th data response as having been correctly received.

In the data representing the request information related to the data retransmission request made from the host device 20 to the data communication device 10, command data for requesting retransmission of the (n+1)th detected data and the (n+2)th detected data is contained, "m" is set in the counter to indicate that the current transmission is the m-th transmission, and "5" is set in the data format. That is, when requesting the data communication device 10 to retransmit detected data, the host device 20 encrypts data related to the data retransmission request and assigns a hash value, based on encryption information and hashing information that correspond to the data format "5" that has been specified by the data communication device 10 during the communication response. The host device 20 then transmits the resulting data.

Upon detecting the request information related to the data retransmission request from the host device 20, the data communication device 10 retransmits the (n+1)th detected data to the host device 20. At this time, in the data related to retransmission of a data response from the data communication device 10 to the host device 20, the data body contains the (n+1)th detected data, "n+1" is set in the counter to indicate that the current transmission is the (n+1)th transmission, and "5" is set in the data format. That is, in retransmitting detected data to the host device 20, the data communication device 10 encrypts the detected data and assigns a hash value, based on encryption information and hashing information that correspond to the data format "5" that has been specified for the data communication device 10 during the communication response. The data communication device 10 then retransmits the resulting data.

Further, in response to the data transmission request from the host device 20, the data communication device 10 retransmits the (n+2)th detected data to the host device 20. At this time, in the data related to retransmission of a data response from the data communication device 10 to the host device 20, the data body contains the (n+2)th detected data, "n+2" is set in the counter to indicate that the current transmission is the (n+2)th transmission, and "5" is set in the data format. That is, in retransmitting detected data to the host device 20, the data communication device 10 encrypts the detected data and assigns a hash value, based on encryption information and hashing information that correspond to the data format "5" that has been specified for the data communication device 10 during the communication response. The data communication device 10 then retransmits the resulting data.

Subsequently, when the time elapsed from the retransmission of the (n+2)th detected data reaches a predetermined time, the data communication device 10 detects data again, and transmits the detected data to the host device 20 as the (n+4)th data response. At this time, in the data related to the data response made from the data communication device 10 to the host device 20, the data body contains the (n+4)th detected data, "n+4" is set in the counter to indicate that the current transmission is the (n+4)th transmission, and "5" is set in the data format.

In this way, if the host device 20 fails to receive detected data from the data communication device 10, the host device 20 requests the data communication device 10 to retransmit detected data. The host device 20 is thus able to acquire detected data from the data communication device 10 again. This allows the host device 20 to acquire detected data transmitted from the data communication device 10, without missing or loss of the data.

Modifications

In the data communication system 1 according to a modification, during data communication in controlling the data communication device 10, the host device 20 may, for the data communication device 10, execute an encryption process, or perform computation on IV and the data body based on a hashing scheme.

For example, the data communication device 10 connected to the host device 20 may be a control device that controls a device (not illustrated) in accordance with control data transmitted from the host device 20. For example, the control device may be configured to selectively open or close a door in accordance with control data transmitted from the host device 20.

The host device 20 may acquire encryption information and hashing information from the data format contained in the data related to a communication response made from the data communication device 10 serving as a control device, and transmit, to the data communication device 10, control data that has been encrypted and assigned a hash value based on the acquired encryption information and the acquired hashing information. The data communication device 10 may control a device in accordance with data obtained by decrypting the control data acquired from the host device 20. For example, the data communication device 10 may be configured to, based on the control data acquired from the host device 20, selectively open or close a door.

The functions of the data communication system 1 according to the embodiments and the modifications mentioned above may be distributed among various devices in accordance with patterns as illustrated in FIG. 7. FIG. 7 illustrates an example of the distribution of functions in the data communication system 1.

As illustrated in FIG. 7, major functions related to the data communication system 1 include the following functions: a data acquisition function, which acquires data such as $CO_2$ from a target space; a data collection function, which collects data acquired by each of the at least one data communication device 10; a computation function, such as analyzing temporal changes in $CO_2$ concentration in the target space by use of the collected data; a control-data generation function, such as generating control data for displaying the analysis results; and an operation function, such as displaying, in accordance with the control data, temporal changes in $CO_2$ concentration.

In Pattern 1 of distribution of functions, the data communication device 10 has the data acquisition function, the host device 20 has the data collection function, the central processing device 30 has the computation function and the control-data generation function, and the terminal device 40 has the operation function.

In Pattern 2 of distribution of functions, the data communication device 10 has the data acquisition function, the host device 20 has the data collection function and the computation function, the central processing device 30 has the control-data generation function, and the terminal device 40 has the operation function.

In Pattern 3 of distribution of functions, the data communication device 10 has the data acquisition function, the host device 20 has the data collection function, the computation function, and the control-data generation function, and the terminal device 40 has the operation function. In Pattern 3, the host device 20 is integrated with the central processing device 30. A device including the host device 20 and the central processing device 30 that are integrated with each other may be a PC, or may be a server or a cloud.

What range of functions the data communication system 1 includes can be also differentiated by Patterns A to D. For example, in Pattern A, the data communication system 1 includes the data acquisition function and the data collection function. In Pattern B, the data communication system 1 includes the data acquisition function, the data collection function, and the computation function. In Pattern C, the data communication system 1 includes the data acquisition function, the data collection function, the computation function, and the control-data generation function. In Pattern D, the data communication system 1 includes the data acquisition function, the data collection function, the computation function, the control-data generation function, and the operation function.

Aspects (Item 1) A data communication system (1) according to an aspect includes at least one data communication device (10), and a host device (20) capable of communicating with the at least one data communication device. Each of the at least one data communication device transmits encryption information to the host device, the encryption information being related to an encryption scheme previously determined in correspondence with the data communication device. The host device receives the encryption information from each of the at least one data communication device. The host device and each of the at least one data communication device perform data communication with each other based on the encryption information.

(Item 2) In the data communication system according to Item 1, the host device and each of the at least one data communication device vary, based on the encryption information, whether or not to encrypt data in data communication.

(Item 3) In the data communication system according to Item 1 or 2, each of the at least one data communication device transmits hashing information to the host device, the hashing information being related to a hashing scheme previously determined in correspondence with the data communication device. The host device receives the hashing information from each of the at least one data communication device. The host device and each of the at least one data communication device perform data communication with each other based on the hashing information.

(Item 4) In the data communication system according to Item 3, the host device and each of the at least one data communication device vary, based on the hashing information, whether or not to assign a hash value to data in data communication.

(Item 5) In the data communication system according to any one of Items 1 to 4, each of the at least one data communication device transmits data to the host device, based on the encryption information related to an encryption scheme corresponding to the data communication device.

(Item 6) In data communication system according to any one of Items 1 to 5, when the host device fails to receive data from the at least one data communication device, the host device transmits request information to the at least one data communication device, the request information requesting retransmission of data. The at least one data communication device retransmits data to the host device in response to receiving the request information.

(Item 7) In the data communication system according to any one of Items 1 to 6, the host device transmits data to each of the at least one data communication device, based on the encryption information related to an encryption scheme corresponding to the data communication device.

(Item 8) In the data communication system according to any one of Items 1 to 7, the at least one data communication device includes at least one of a sensor device that detects data, a camera device that captures an image of an object, or a control device that controls a device.

(Item 9) The data communication system according to any one of Items 1 to 8 further includes a central processing device (30) capable of communicating with the host device. The host device transmits data acquired from each of the at least one data communication device to the central processing device after encrypting the data with a predetermined encryption scheme, the predetermined encryption scheme being previously determined irrespective of the at least one data communication device.

(Item 10) The data communication system according to any one of Items 1 to 8 further includes a central processing device (30) capable of communicating with the host device. The host device transmits data acquired from each of the at least one data communication device to the central processing device, with the data being encrypted with an encryption scheme corresponding to the data communication device.

(Item 11) In the data communication system according to any one of Items 1 to 10, the at least one data communication device and the host device are capable of communication via a connector (130, 230) compliant with a USB standard, or communication via a wireless connection.

(Item 12) A data communication device (10) for communication with a host device according to an aspect includes a controller (11), and a communication interface (13) via which to communicate with a host device. The controller receives inquiry information from the host device, the inquiry information being related to an inquiry of an encryption scheme. The controller transmits encryption information to the host device in response to receiving the inquiry information, the encryption information being related to a previously determined encryption scheme. The controller performs, based on the encryption information, data communication with the host device.

(Item 13) A host device (20) according to an aspect includes a controller (21), and a communication interface (23) via which to communicate with at least one data communication device. The controller transmits inquiry information to each of the at least one data communication device, the inquiry information being related to an inquiry of an encryption scheme previously determined in correspondence with the data communication device. The controller receives encryption information from each of the at least one data communication device, the encryption information being related to an encryption scheme corresponding to the data communication device. The controller performs, based on the encryption information, data communication with each of the at least one data communication device.

(Item 14) A data communication method according to an aspect includes the steps of: receiving inquiry information from a host device (20), the inquiry information being related to an inquiry of an encryption scheme; transmitting encryption information to the host device in response to receiving the inquiry information, the encryption information being related to a previously determined encryption scheme; and performing, based on the encryption information, data communication with the host device.

(Item 15) A data communication method according to an aspect includes the steps of: transmitting inquiry information to each of at least one data communication device (10), the inquiry information being related to an inquiry of an encryption scheme previously determined in correspondence with the data communication device; receiving encryption information from each of the at least one data communication device, the encryption information being related to an encryption scheme corresponding to the data communication device; and performing, based on the encryption information, data communication with each of the at least one data communication device.

(Item 16) A data communication program according to an aspect includes the steps of: receiving inquiry information from a host device (20), the inquiry information being related to an inquiry of an encryption scheme; transmitting encryption information to the host device in response to receiving the inquiry information, the encryption information being related to a previously determined encryption scheme; and performing, based on the encryption information, data communication with the host device.

(Item 17) A data communication program according to an aspect includes the steps of: transmitting inquiry information to each of at least one data communication device (10), the inquiry information being related to an inquiry of an encryption scheme previously determined in correspondence with the data communication device; receiving encryption information from each of the at least one data communication device, the encryption information being related to an encryption scheme corresponding to the data communication device; and performing, based on the encryption information, data communication with each of the at least one data communication device.

Although embodiments and modifications have been described above, features in each of such embodiments and modifications may be used in any suitable combination with each other as long as no contradiction occurs.

The embodiments herein disclosed are to be considered as illustrative in all respects and not restrictive. The scope of the present disclosure is defined not by the above description of the embodiments but by the claims, and is intended to include all changes that fall within the meaning and scope of the claims and any equivalents thereof.

What is claimed is:
1. A data communication system comprising;
at least one data communication device; and
a host device capable of communicating with the at least one data communication device, wherein the host device is configured to transmit, to each of the at least one data communication device, inquiry information for requesting a unilateral declaration of an encryption scheme, wherein each of the at least one data communication device is configured to transmit, in response to receiving the inquiry information, encryption information to the host device, the encryption information being related to an encryption scheme previously determined in correspondence with the data communication device and pre-stored in the data communication device, wherein the transmitted encryption information dictates the encryption scheme to be used by the host device, wherein the host device receives the encryption information from each of the at least one data communication device, and wherein the host device and each of the at least one data communication device perform data communication with each other based on the dictated encryption information.

2. The data communication system according to claim 1, wherein the host device and each of the at least one data communication device vary, based on the encryption information, whether or not to encrypt data in data communication.

3. The data communication system according to claim 1, wherein each of the at least one data communication device transmits hashing information to the host device, the hashing information being related to a hashing scheme previously determined in correspondence with the data communication device and pre-stored in the data communication device, wherein the host device receives the hashing information from each of the at least one data communication device, and wherein the host device and each of the at least one data communication device perform data communication with each other based on the hashing information.

4. The data communication system according to claim 3, wherein the host device and each of the at least one data communication device vary, based on the hashing information, whether or not to assign a hash value to data in data communication.

5. The data communication system according to claim 1, wherein each of the at least one data communication device transmits data to the host device, based on the encryption information related to an encryption scheme corresponding to the data communication device and pre-stored in the data communication device.

6. The data communication system according to claim 5, wherein based on the host device failing to receive data from the at least one data communication device, the host device transmits request information to the at least one data communication device, the request information requesting retransmission of data, and wherein the at least one data communication device retransmits data to the host device in response to receiving the request information.

7. The data communication system according to claim 1, wherein the host device transmits data to each of the at least one data communication device, based on the encryption information related to an encryption scheme corresponding to the data communication device.

8. The data communication system according to claim 1, wherein the at least one data communication device includes at least one of a sensor device that detects data, a camera device that captures an image, or a control device that controls a device.

9. The data communication system according to claim 1, further comprising a central processing device capable of communicating with the host device, wherein the host device transmits data acquired from each of the at least one data communication device to the central processing device after encrypting the data with a predetermined encryption scheme, the predetermined encryption scheme being previously determined irrespective of the at least one data communication device.

10. The data communication system according to claim 1, further comprising a central processing device capable of communicating with the host device, wherein the host device transmits data acquired from each of the at least one data communication device to the central processing device, with the data being encrypted with the encryption scheme previously determined corresponding to the data communication device.

11. The data communication system according to claim 1, wherein the at least one data communication device and the host device are capable of communication via a connector compliant with a USB standard, or communication via a wireless connection.

12. A data communication device for communication with a host device, the data communication device comprising:

a control circuit;

a memory; and a communication interface via which to communicate with the host device, wherein the control circuit is configured to receive inquiry information from the host device, the inquiry information for requesting a unilateral declaration of an encryption scheme, transmit encryption information to the host device in response to receiving the inquiry information, the encryption information being related to a previously determined encryption scheme and pre-stored in the memory, wherein the transmitted encryption information dictates the encryption scheme to be used by the host device, and perform, based on the dictated encryption information, data communication with the host device.

13. A host device for communication with at least one data communication device, the host device comprising:

a control circuit; and a communication interface via which to communicate with the at least one data communication device, wherein the control circuit is configured to transmit inquiry information to each of the at least one data communication device, the inquiry information for requesting a unilateral declaration of an encryption scheme previously determined in correspondence with the data communication device, receive encryption information from each of the at least one data communication device transmitted in response to receiving the inquiry information, the encryption information being related to an encryption scheme corresponding to the data communication device and being pre-stored in the data communication device, wherein the transmitted encryption information dictates the encryption scheme to be used by the host device, and performs, based on the dictated encryption information, data communication with each of the at least one data communication device.

14. A data communication method, the data communication method being executable by a computer for causing a data communication device to communicate with a host device, the data communication method comprising:

receiving inquiry information from the host device, the inquiry information for requesting a unilateral declaration of an encryption scheme;

transmitting encryption information to the host device in response to receiving the inquiry information, the encryption information being related to a previously determined encryption scheme and being pre-stored in the data communication device;

wherein the transmitted encryption information dictates the encryption scheme to be used by the host device, and performing, based on the dictated encryption information, data communication with the host device.

15. A data communication method, the data communication method being executable by a computer for causing a host device to communicate with at least one data communication device, the data communication method comprising:

transmitting inquiry information to each of the at least one data communication device, the inquiry information for requesting a unilateral declaration of an encryption scheme previously determined in correspondence with the data communication device;

receiving encryption information from each of the at least one data communication device transmitted in response to receiving the inquiry information, the encryption information being related to an encryption scheme corresponding to the data communication device and being pre-stored in the data communication device;

wherein the transmitted encryption information dictates the encryption scheme to be used by the host device, and performing, based on the dictated encryption information, data communication with each of the at least one data communication device.

16. A non-transitory computer readable storage medium storing a data communication program that, when executed by a computer, causes the computer to perform a method of causing a data communication device to communicate with a host device, the method comprising:

receiving inquiry information from the host device, the inquiry information for requesting a unilateral declaration of an encryption scheme;

transmitting encryption information to the host device in response to receiving the inquiry information, the encryption information being related to a previously determined encryption scheme and being pre-stored in the data communication device;

wherein the transmitted encryption information dictates the encryption scheme to be used by the host device, and performing, based on the dictated encryption information, data communication with the host device.

17. A non-transitory computer readable storage medium storing a data communication program that, when executed by a computer, causes the computer to perform a method of causing a host device to communicate with at least one data communication device, the method comprising:

transmitting inquiry information to each of the at least one data communication device, the inquiry information for requesting a unilateral declaration of an encryption scheme previously determined in correspondence with the data communication device;

receiving encryption information from each of the at least one data communication device transmitted in response to receiving the inquiry information, the encryption information being related to an encryption scheme corresponding to the data communication device and being pre-stored in the data communication device;

wherein the transmitted encryption information dictates the encryption scheme to be used by the host device, and performing, based on the dictated encryption information, data communication with each of the at least one data communication device.

18. The data communication device of claim 12, wherein the control device is further configured to:

based on the host device failing to receive data from the data communication device, receive, from the host device, request information requesting retransmission of data, and retransmit data to the host device in response to receiving the request information.

19. The method of claim 16, further comprising:

based on the host device failing to receive data from the data communication device, receiving from the host device request information requesting retransmission of data, and retransmitting data to the host device in response to receiving the request information.

20. The host device of claim 13, wherein the control device is further configured to:

based on the host device failing to receive data from one of the at least one data communication device, transmit request information requesting retransmission of data to the one of the at least one data communication device, and receive data from the one of the at least one data communication device in response to receiving the request information.

* * * * *